(No Model.)
J. W. EPPERSON.
LISTED CORN CULTIVATOR.
No. 449,527. Patented Mar. 31, 1891.
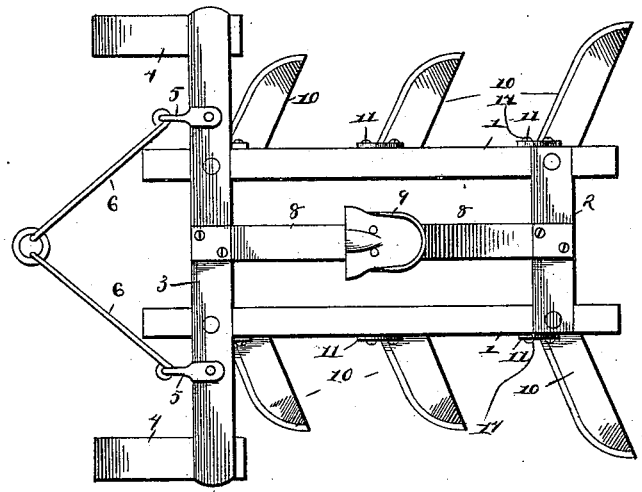
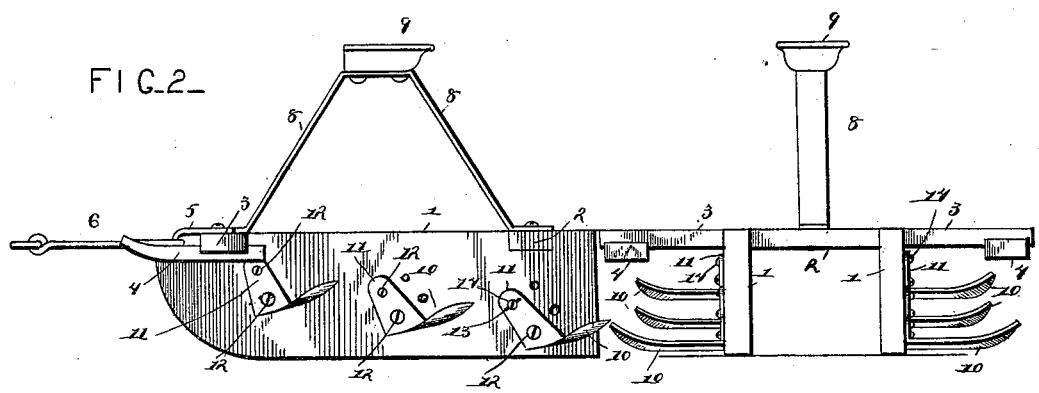
Witnesses:
Geo. E. Frich.
W. S. Duvall.
Inventor
Jas. W. Epperson
By his Attorneys,
C. A. Snow & Co.

UNITED STATES PATENT OFFICE.

JAMES W. EPPERSON, OF GREAT BEND, KANSAS.

LISTED-CORN CULTIVATOR.

SPECIFICATION forming part of Letters Patent No. 449,527, dated March 31, 1891.

Application filed November 12, 1890. Serial No. 371,222. (No model.)

*To all whom it may concern:*

Be it known that I, JAMES W. EPPERSON, a citizen of the United States, residing at Great Bend, in the county of Barton and State of Kansas, have invented a new and useful Improvement in Listed-Corn Cultivators, of which the following is a specification.

This invention has relation to a cultivator, and to that particular class thereof designed to cultivate the ground and destroy weeds between rows of listed corn.

The objects of the invention are to provide a machine adapted to straddle the rows of listed corn, destroy all weeds at the sides of the rows, thoroughly pulverize the soil and deliver the same in rear of the machine around the corn, said device to be adjustable in certain points, whereby the delivery of the soil may be regulated.

Other objects and advantages of the invention will appear in the following description, and the novel features thereof will be particularly pointed out in the claims.

Referring to the drawings, Figure 1 is a plan of a cultivator constructed in accordance with my invention. Fig. 2 is a side elevation. Fig. 3 is a rear elevation.

Like numerals of reference indicate like parts in all the figures of the drawings.

1 designates a pair of opposite parallel runners of suitable height connected at their rear ends by a cross-bar 2, terminating flush with the outer sides of the runners, and at their front ends by a transverse cross-bar 3, the ends of which occur some distance from the sides of the runners and are provided with shoes 4, the front ends of which are upturned, so as to readily slide over the ground. A pair of draft-links 5 are connected to the bar 3 between each runner and its adjacent shoe, and a draft-bail 6 has its ends connected to the link and is adapted for connection with the clevis of a single or double tree. Seat-standards 8 arise from the cross-bars 2 and 3 and have mounted upon their inner ends a driver's seat 9.

The runners are preferably solid and each has secured thereto a series of, in this instance, three knives or cutters, the inner ends or shanks of which are upwardly bent to form securing-plates 11. The knives 10 have their front edges curved and ground to a cutting-edge and are slightly deflected to the rear, which I accomplish by forming the line upon which the plates 11 are bent at an obtuse angle to the knives; and, furthermore, said knives are slightly concaved upon their upper sides, or, in other words, have their outer ends slightly upwardly deflected. It will also be observed that the rear pair of knives are secured to the runners at about the lower edge of the same, the next pair slightly above said edge, and the front pair still farther above, so that when drawn over a row of corn the knives take into the ridges at the opposite sides of the cultivator and thoroughly pulverize all lumps of soil, at the same time cutting against the ridges any weeds that may be growing there. The curvature of the rear knife serves to deliver the soil turned by the same around the rear ends of the runners around the corn. Each of the plates 11 is provided with a pair of perforations 12, the upper perforation of the rear plate being in the form of a slot 13, and through each of the perforations of the plates is passed a bolt or screw 14 into corresponding perforations formed in the runners, the pairs of perforations of the runners being inclined, as shown, or, in other words, arranged diagonally opposite each other. The rear pairs of screw-openings in the runners are duplicated a slight distance in rear and below those mentioned, so that the rear knives may be adjusted to cut at different depths and may also be adjusted by means of the slots in their upper ends, so as to give them the proper inclination. By locating the rear pair of runners in the rear slots an increased quantity of soil is directed around the corn. The lateral shoes 4 ride alone the opposite ridges and serve to crush any clods that may lie along the ridges, after which they are pulverized by the cutters. The curvature of the rear knives serves to deliver the soil turned by the same around the corn.

Having described my invention, what I claim is—

1. In a cultivator, the combination, with a pair of runners, cutters located at the opposite sides of the runners and arranged one above the other, of a transverse bar connecting the runners and terminating at its outer ends in shoes, substantially as specified.

2. In a cultivator of the class described, the combination, with opposite runners, of a series of laterally-disposed cutters or knives having curved cutting-edges and arranged one above the other, the rear cutter having a concaved upper face and adapted to throw soil in rear of the runners, substantially as specified.

In testimony that I claim the foregoing as my own I have hereto affixed my signature in presence of two witnesses.

JAMES W. EPPERSON.

Witnesses:
E. R. MOSES,
WM. H. DODGE.